Mar. 6, 1923.
F. SIMONE
1,447,735
TICKET DELIVERING MACHINE
Filed Apr. 16, 1920
2 sheets-sheet 2
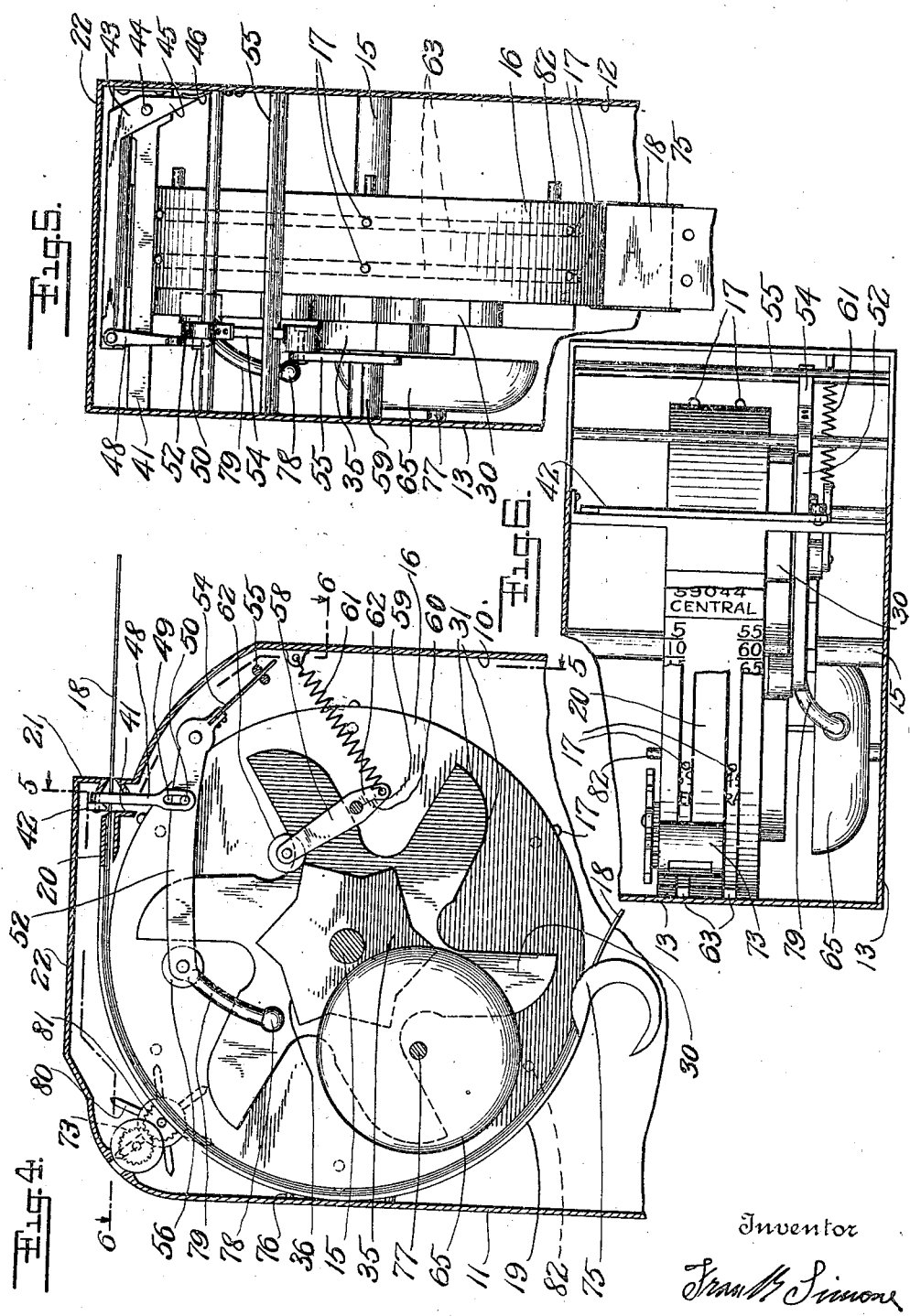
Inventor
Frank Simone Patented Mar. 6, 1923.

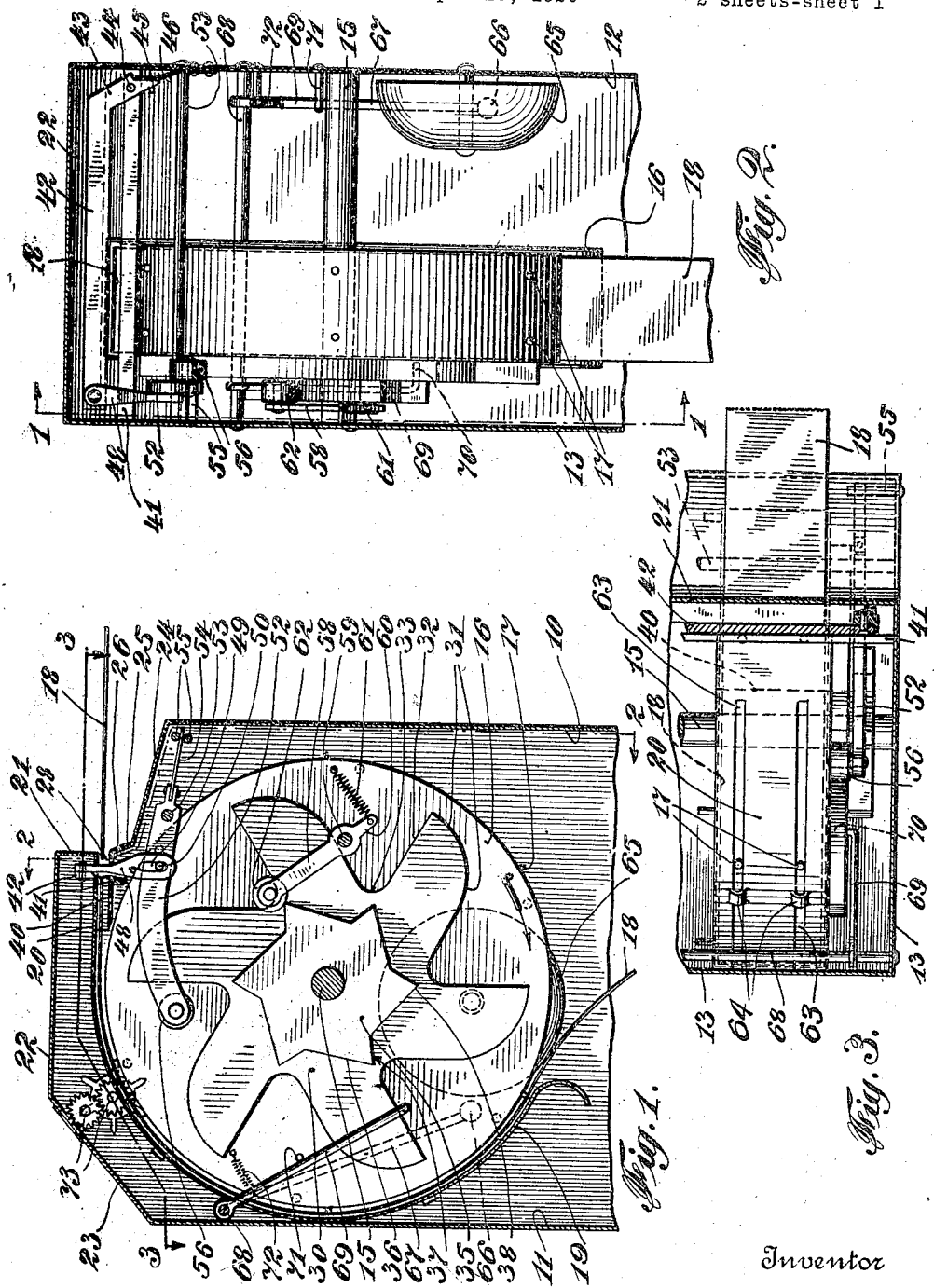

1,447,735

UNITED STATES PATENT OFFICE.

FRANK SIMONE, OF NEW YORK, N. Y.

TICKET-DELIVERING MACHINE.

Application filed April 16, 1920. Serial No. 374,459.

*To all whom it may concern:*

Be it known that I, FRANK SIMONE, a citizen of the United States, and a resident of the city of New York, county of New York, and State of New York, have invented certain new and useful Improvements in Ticket-Delivering Machines, of which the following is a specification.

The main object of this invention is to provide a machine capable of successively delivering single tickets from a rolled strip, the mechanism being automatically operated by the withdrawal of the ticket and including devices for feeding, severing and extending the ticket into a conveniently accessible position.

Further objects are to combine with the mechanism means for audibly announcing the withdrawal of each ticket, registering the number dispensed, and generally in the simplicity and efficiency of its operation.

These objects are attained by the novel construction, combination and arrangement of parts hereinafter described and shown in the accompanying drawings, forming a material part of this disclosure, and in which:—

Figure 1 is a vertical sectional view of a ticket delivering machine made in accordance with the invention, the section being taken on line 1—1 of Fig. 2.

Figure 2 is a front elevational and sectional view with the casing plate removed, the view being taken on line 2—2 of Fig. 1.

Figure 3 is a fragmentary horizontal sectional view taken on line 3—3 of Fig. 1.

Figure 4 is a view similar to Fig. 1 but showing a modification in construction.

Figure 5 is a sectional view on line 5—5 of Fig. 4.

Figure 6 is a transverse sectional view taken on line 6—6 of Fig. 4.

Referring to the drawings in detail, the numeral 10 designates the front wall of a substantially rectangular casing, 11 the rear, and 12 and 13 respectively the right and left hand side walls.

Extending between the side walls is a shaft 15 on which is mounted a wheel 16 having a plurality of spaced pairs of pin-like projections 17 engaged in the perforations of a ticket strip 18 passing over the periphery of the wheel and held thereagainst by a curved guard 19 merging, at its upper end, into the lower element 20 of the cover, which is turned upward, forming an abutment 21, and then rearward into the casing cover 22, having a diagonal portion 23 joining the rear wall 11.

The front wall 10 extends upward to a point even with the junction of the elements 11 and 23 and thence diagonally inward, forming a shelf 24 bevelled upward at 25 and thence inward as at 26, parallel to the upper portion of the guide plate 19 and having between them a narrow space 28 through which the end of the ticket strip 18 normally extends.

Fixed upon the side of the wheel 16 is a sextuple lobed cam 30, each lobe having a curved profile 31 on its advancing edge, the other edge 32 being radial and joining the next adjacent lobe by a concave curve 33, the position of the cam being adjusted with reference to the projections 17.

Secured to the side of the cam is a star plate 35 centered on the shaft 15. This star has an outline comprised of alternate long and short sides, respectively 36 and 37, meeting at the points 38 which are arranged with reference to the lobes of the cam, for purposes later apparent.

A rigid plate 40 extends between the sides 12 and 13, and to its thicker, outer edge is attached a shear blade 41, the upper surfaces of the bar and blade being in register with the element 26, below the opening 28.

A movable cutter blade 42 is formed with an angular end 43, pivoted on a pin 44 set in the casing, the extending angular end 45 being pressed inwardly by a flat spring 46, as best shown in Fig. 2, the effect being to maintain the movable shear blade in a normally raised position.

At the opposite end of the blade, which operates in the manner of a lever, is pivotally attached a link 48 having in its lower end a slot 49 in which is engaged a pin 50 fixed in a curved lever 52 pivoted on a rod 53 secured between the walls of the casing.

The outer extending end of the lever 52 has rigidly secured to it a flat spring 54 held between a pair of pins 55 set in the casing wall 13, the action of the spring being to support the lever in a central, neutral position.

At the inner end of the lever is a roller 56 contactable with the curved profiles 31 of the cam as it is rotated in the direction indicated by the arrow, the effect being to raise the free end of the lever, which due to the slot 49, permits the pin to move upwardly without effecting a corresponding movement of the shear 42, but stressing the spring 54.

When the roller passes over the points of the cam lobes and is impelled downward alongside the radial edges 32 of the cam lobes, by action of the spring 54, the roller approaches the curves 33, at which time the pin 50 contacts with the lower end of the slot and draws the blade 42 down past the fixed blade 41, severing the strip therebetween, the blade being returned by the spring 46 and the lever by the spring 54 to their normal positions.

A lever 58 is pivoted on a pin 59 set in the casing wall 13, its end 60 being drawn outward by the tension spring 61. At the opposite, free end of the lever 58 is a roller 62 held in contact with the star 35 by the spring 61, the action being to cause the roller to ride up the incline presented by the longer angles 36, stressing the spring 61, until the high points 38 of the star has been passed, whereupon the tension of the spring acting through the lever and roller, in moving down the short angle 37, causes the star, cam and wheel to make a portion of a revolution, sufficient to advance the strip into position to be grasped by an operator.

Obviously when the extended strip is withdrawn, the cycle of operation is performed, severing the ticket from the strip and then extending the strip for further extraction.

In order to permit the pins 17 to pass freely by the guard 19, the latter is formed with the parallel slots 63 extending along its entire length in contact with the strip 18, bridge connections 64 preventing spreading of its sections.

A bell 65 is fixed to the wall 12 of the casing, and contactable with the bell is a hammer 66 mounted on a spring bar 67, fixed on a rod 68 passing through the casing. An arm 69 is secured to the bar 67 and has an angular terminal 70 engageable by the lobes of the cam so as to be operated as the cam is rotated.

A stop 71 limits the movement of the arm 69 inwardly towards the shaft 15, the arm being normally drawn against the stop by a tension spring 72.

Thus at the passage of each cam lobe, corresponding to the delivery of a single ticket, an audible announcement is given.

A register, generally designated by the numeral 73, is arranged to show through a transparently covered opening, in the casing cover element 23, the register being operated by the wheel 16 to correctly indicate the number of tickets dispensed.

In the modification shown in Figs. 4, 5 and 6 the same general construction is used, except the guide 19, which is flanged upwardly along both bottom edges 75, the flanges being used to guide the paper strip 18 as it is entered, and in place of the connecting bridge 64, bracket elements 76 are used to firmly engage the sections of the guard 19 to the casing wall 11.

The bell 65 is arranged in a different position on the post 77 its striking hammer 78 being carried on an arm 79 curved outwardly and downwardly from the free end of the lever 52, with which it is formed.

The register 73, as indicated, is actuated by arms 80 extending from the actuator gear 81, the same making contact with pins 82 set in the side of the wheel 16 near its periphery so that at intermittent movement of the wheel the register is caused to indicate the delivery of a ticket.

Having thus described my invention and set forth the manner of its construction and use, what I claim as new and desire to secure by Letters Patent, is:—

1. In a ticket delivering machine, the combination with a casing and a ticket strip carrying wheel therein, of a fixed shear, a co-operative movable shear, a multi-lobed cam fixed on the side of said wheel, a lever pivoted in said casing, means for normally holding said lever in a neutral position, a roller carried at the inner end of said lever engageable with the lobes of said cam, a link connecting said lever and movable shear, and means for normally holding said shear in a raised position.

2. In a ticket delivering machine, the combination with a casing and a ticket strip carrying wheel therein, of a fixed shear, a co-operative movable shear, a lever pivoted to extend along the side of said wheel, means for holding said lever in a neutral position, link connections between said movable shear and said lever, said connections permitting the lever to move upwardly without conveying motion to the shear, and means on the side of said wheel for actuating said lever during portions of its revolution.

3. In a ticket delivering machine, the combination with a casing and a ticket strip carrying wheel therein, of a fixed shear, a co-operative movable shear, a lever pivoted to extend along the side of said wheel, means for holding said lever in a neutral position, link connections between said movable shear and said lever, said connections permitting the lever to move upwardly without conveying motion to the shear, means on the side of said wheel for raising said lever co-incidently with extracting a ticket, and means for supplementing the rotation of said wheel to extend the end of the strip.

4. In a ticket delivering machine, the combination with a casing and a ticket strip carrying wheel therein, actuated by tension exerted on the strip, shear blades for severing the strip within the casing, one of said blades being fixed and the other movable, means actuated by said wheel for periodically operating said movable blade, and means for positively extending the severed end of the strip into position for delivering.

5. In a ticket delivering machine, the combination with a casing and a ticket strip carrying wheel therein rotated by withdrawing the strip, of a fixed shear, a lever shear co-operative therewith, a multi-lobed cam on the side of said wheel, a star wheel co-ordinating with said cam, a spring actuated lever pivoted in said casing, a roller carried by said lever engaging the points of the star-wheel to advance the ticket carrying wheel, a second lever operated by each lobe of said cam, and a slotted link connecting said lever and said shear whereby the latter is operated.

6. In a ticket delivering machine, the combination with a casing, a wheel rotatably mounted therein actuated by drawing the strip outwardly, means on the periphery of said wheel engageable with a ticket strip, and a curved guide plate adapted to confine the strip to said wheel, of a fixed shear in said casing over which the strip passes, a movable shear pivoted to co-operate therewith, means for normally holding said movable shear raised, and means operated by the partial revolution of said wheel for actuating the movable shear.

7. In a ticket delivering machine, a casing, a ticket strip carrying wheel therein, prongs on said wheel engaging openings in the ticket strip, said prongs rotating the wheel as the strip is withdrawn, shear-blades for severing the strip within the casing, means actuated by the rotation of the wheel for operating one of said blades periodically, and means for further rotating said wheel to extend the severed end of the strip after operation of said blades.

In testimony whereof I have signed my name to this specification.

FRANK SIMONE.